(12) United States Patent
Lee

(10) Patent No.: US 9,697,210 B1
(45) Date of Patent: Jul. 4, 2017

(54) DATA STORAGE TESTING

(75) Inventor: Scott Lee, Kennesaw, GA (US)

(73) Assignee: Cbeyond Communications, LLC, Atlanta, GA (US)

( * ) Notice: Subject to any disclaimer, the term of this patent is extended or adjusted under 35 U.S.C. 154(b) by 2013 days.

(21) Appl. No.: 12/493,546

(22) Filed: Jun. 29, 2009

(51) Int. Cl.
*G06F 12/00* (2006.01)
*G06F 17/30* (2006.01)
*G06F 13/14* (2006.01)

(52) U.S. Cl.
CPC .............................. *G06F 17/30067* (2013.01)

(58) Field of Classification Search
CPC ........... G06F 17/2247; G06F 17/30923; G06F 17/30067; G06F 17/30079; G06F 17/3028
USPC ....... 707/705, 722, 769, 641, 672, 661, 654, 707/657, 655, 649, 726, 660, 690, 737, 707/741, 797, 802, 822–883, 999.102, 707/999.1, E17.012, 803, 831, E17.01, 707/17.031, 999.107; 709/205, 202, 709/217–236; 370/392; 717/102, 115, 717/108, 131, 136, 717, 174, 733
See application file for complete search history.

(56) References Cited

U.S. PATENT DOCUMENTS

| | | | |
|---|---|---|---|
| 6,219,829 B1 * | 4/2001 | Sivakumar | G06F 11/3664 714/E11.208 |
| 6,438,714 B1 | 8/2002 | Canestaro et al. | |
| 6,557,120 B1 | 4/2003 | Nicholson et al. | |
| 6,614,789 B1 * | 9/2003 | Yazdani | G06F 17/30985 370/392 |
| 7,574,457 B2 * | 8/2009 | Douceur | G06F 17/3012 |
| 7,953,733 B2 * | 5/2011 | Nakase | G06F 17/3028 707/726 |
| 2005/0010610 A1 * | 1/2005 | Nishimura | G06F 17/30067 |
| 2005/0256871 A1 * | 11/2005 | Semerdzhiev | G06F 17/30067 |

OTHER PUBLICATIONS

"System::Test—Module for testing file system drivers." [Retrieved on Feb. 6, 2009]. Retrieved from the internet: <http://74.125.47.132/search?q=cache:btX8Z2LQ94D:search.cpan.org/perldoc%3FFile::Syst . . . >, 4 pages.
Wright et al., "Auto-pilot: A Platform for System Software Benchmarking." [Retrieved on Feb. 6, 2009]. Retrieved from the internet: http://www.fsl.cs.sunysb.edu/docs/apv2/apv2.html>, 18 pages.
"Helios File System Test." [Retrieved on Feb. 6, 2009]. Retrieved from the internet: <http://www.helios.de/products/FileTest.phtml>, 4 pages.

\* cited by examiner

*Primary Examiner* — Heather Herndon
*Assistant Examiner* — Cecile Vo
(74) *Attorney, Agent, or Firm* — Fish & Richardson P.C.

(57) ABSTRACT

Methods, systems, and apparatus, including computer program products, for creating test directories and files in a logical storage in a data storage system. The directories include a root directory subdirectories in the root directory. Each directory has a directory key name that has a prefix value; a subdirectory value, the subdirectory value defining a number of immediate subdirectories in the directory; a subdirectory prefix value, the subdirectory prefix value defining a prefix value of each directory key name of each immediate subdirectory in the directory; and a file value, the file value defining a number of files stored in the directory. The contents of any directory can be checked against the directory key name to determine if a data storage error has occurred during testing.

25 Claims, 13 Drawing Sheets

Directory Key Values: Prefix_Subdirectory_Subdirectory Prefix_File_Content
File Key Values: Prefix_Count_Size Directory Key Values: Prefix_Subdirectory_Subdirectory Prefix_File_Content
File Key Values: Content_Count_Size

DATA STORAGE TESTING

BACKGROUND

This specification relates to testing storage systems.

Computer storage requirements are continually increasing as more data are being created and as processing and system requirements increase. As a result, it is quite common for users (e.g., business entities or individual persons) to require hundreds or even thousands of gigabytes of disk storage. To meet these needs, users often use a virtualized storage device. Virtualization of a storage device is the logical grouping of physical storage from multiple network storage devices into what appears to be a single logical storage virtualization results in a significant reduction in hardware and maintenance costs. A storage device using a file system and an array of hardware storage devices can provide large quantities of logical storage at a relatively small marginal cost.

The architecture of such storage devices can be complex, and there can be many potential failure points in the storage device. Accordingly, before the storage device is enabled for use by users, it is desirable to perform integrity testing on the storage device. There are, however, a variety of integrity tests that can be used. Example integrity tests include reading and writing known byte patterns over an entire logical storage; file access testing (e.g., read/write testing); integration testing each individual storage device (i.e., each hard drive) on an individual basis; etc. Many of these tests can reveal problems with particular hard drives, device drivers, and the logical storage at the file system level, i.e., at the level of the database or other architectural construct that defines the storage, organization, manipulation, and retrieval of data in storage devices. However, many of these integrity tests are designed for an uninterrupted test instance, and do not persist data structures that are representative of normal use of the logical storage and that can be accessed at an arbitrary later time to determine if a storage error has occurred.

SUMMARY

In general, one aspect of the subject matter described in this specification can be embodied in methods that include the actions of creating a prefix queue in a computer memory; generating in the computer memory a prefix value for a new directory; generating in the computer memory a subdirectory value defining a number of immediate subdirectories in the new directory, a subdirectory prefix value defining a prefix value of each directory key name of each immediate subdirectory to be created in the new directory, and a file value for the new directory defining a number of files to be stored in the new directory; creating in a logical storage the new directory with a directory key name comprising the prefix value, the subdirectory value, the subdirectory prefix value, and the file value; selecting the new directory as a current directory; creating in the computer memory a plurality of subdirectory prefix values based on the subdirectory value and the subdirectory prefix value of the directory key name of the current directory; storing the plurality of subdirectory prefix values in the prefix queue in the computer memory; and writing the number of files in the current directory defined by the file value in the directory key name of the current directory. Other embodiments of this aspect include corresponding systems, apparatus, and computer program products.

Another aspect of the subject matter described in this specification can be embodied in methods that include the actions of accessing a data storage system in data communication with the data processing apparatus; creating a plurality of directories in a logical storage in the data storage system, the directories including a root directory and a plurality of subdirectories in the root directory, each directory having a directory key name comprising a plurality of values that are deterministic of: a number of immediate subdirectories stored in the directory; at least a portion of the directory key name of each subdirectory; a number of files stored in the directory; and at least a portion of the file name of each file stored in the subdirectory. Other embodiments of this aspect include corresponding systems, apparatus, and computer program products.

Particular embodiments of the subject matter described in this specification can be implemented to realize one or more of the following advantages. The directory key name for each directory can be processed to determine whether the directory includes the correct number of subdirectories and files stored in the directory, and whether the names, or portions thereof, of the subdirectories and file are correct. Particular values in the directory key name and/or file names can be used as seeds in a deterministic pseudo-random number generator (PRNG) to determine subsequent values in the directory key names and file names. Accordingly, a single seed input for a root directory can be used to deterministically generate an entire test directory structure and corresponding test files for a logical storage.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
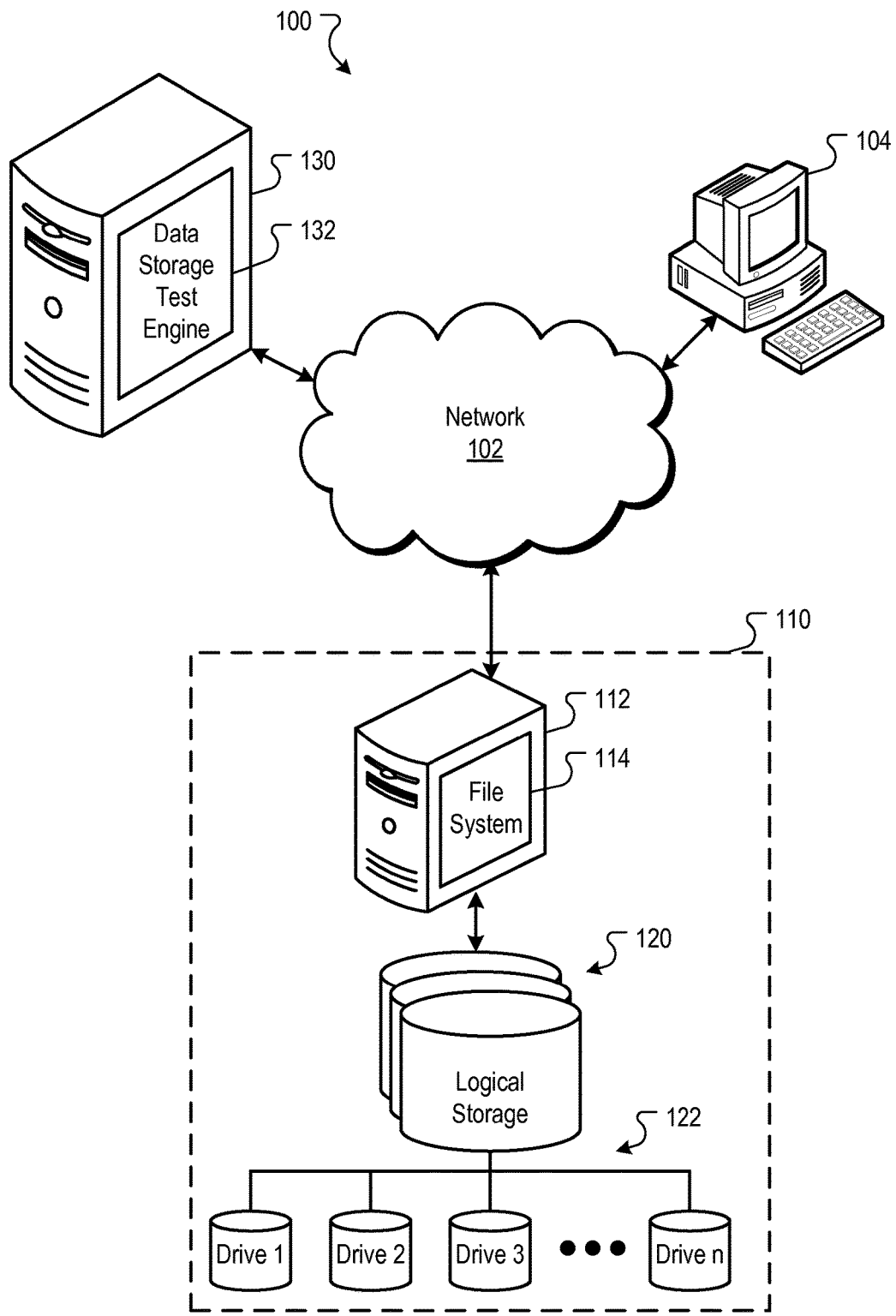
FIG. 1 is an environment in which data storage testing is performed.

FIG. 1 is an environment 100 in which in which data storage testing is performed. A computer network 102, such as the Internet, connects a user device 104, such as a computer, to a network storage system 110 so that the user device 104 and the network storage system 110 are in data communication. The network storage system 110 includes a data processing apparatus 102, such as a server computer 112, or a collection of server computers, and provides a plurality of logical stores 120. The logical stores 120 are an abstraction of physical storage. The physical storage, such as disk drives, for example, is provided by an array of storage devices 122, e.g., the disk drives 1 . . . n. In some implementations, each logical storage can correspond to a particular drive 122. In other implementations, a logical storage can be physically associated with multiple drives 122.

The virtualization of storage provides a logical space for data storage and by mapping the logical space to actual physical locations in the drives 122. The actual form of the mapping will depend on the chosen implementation. The server computer 112 includes a file system 114 that implements the mapping and management of the logical stores 120 and the drives 122. The file system 114 includes a database or other architectural construct that defines the storage, organization, manipulation, and retrieval of data in storage devices 122. Many different types of file systems 114 can be used, depending on the hardware and software requirements. Example file systems include the Network File System (NFS), the NT File System (NTFS), the ZFS file system (formerly known as the "Zettabyte file system"), to name just a few.

It is often desirable to conduct a data storage test on a logical storage 120 of the network storage system 110. For example, when adding additional storage devices to the existing storage devices 122, the additional storage devices can be mapped as a single logical space to undergo data storage testing. Such testing can reveal faulty storage devices 122 or incompatibilities between the storage devices 122 and the file system 114. Alternatively, when updating the file system 114 or implementing a new file system, the file system can itself undergo data storage testing.

To implement the data storage testing, a data processing apparatus 130, such as a server computer, can execute a data storage test engine 132. The test engine 132 can be implemented using software instructions, such as a script or executable code, that are executable by the data processing apparatus 130. Upon such execution, the data processing apparatus performs the operations described with reference to FIGS. 2-4 below.

Although the data processing apparatus 130 is depicted as being in data communication with the network storage system 110 over the network 102, the data processing apparatus can also be implemented in the network storage system 110. For example, the test engine 132 can be implemented in one of the servers of the data processing apparatus 112. Other implementations can also be used.

Figure 2:
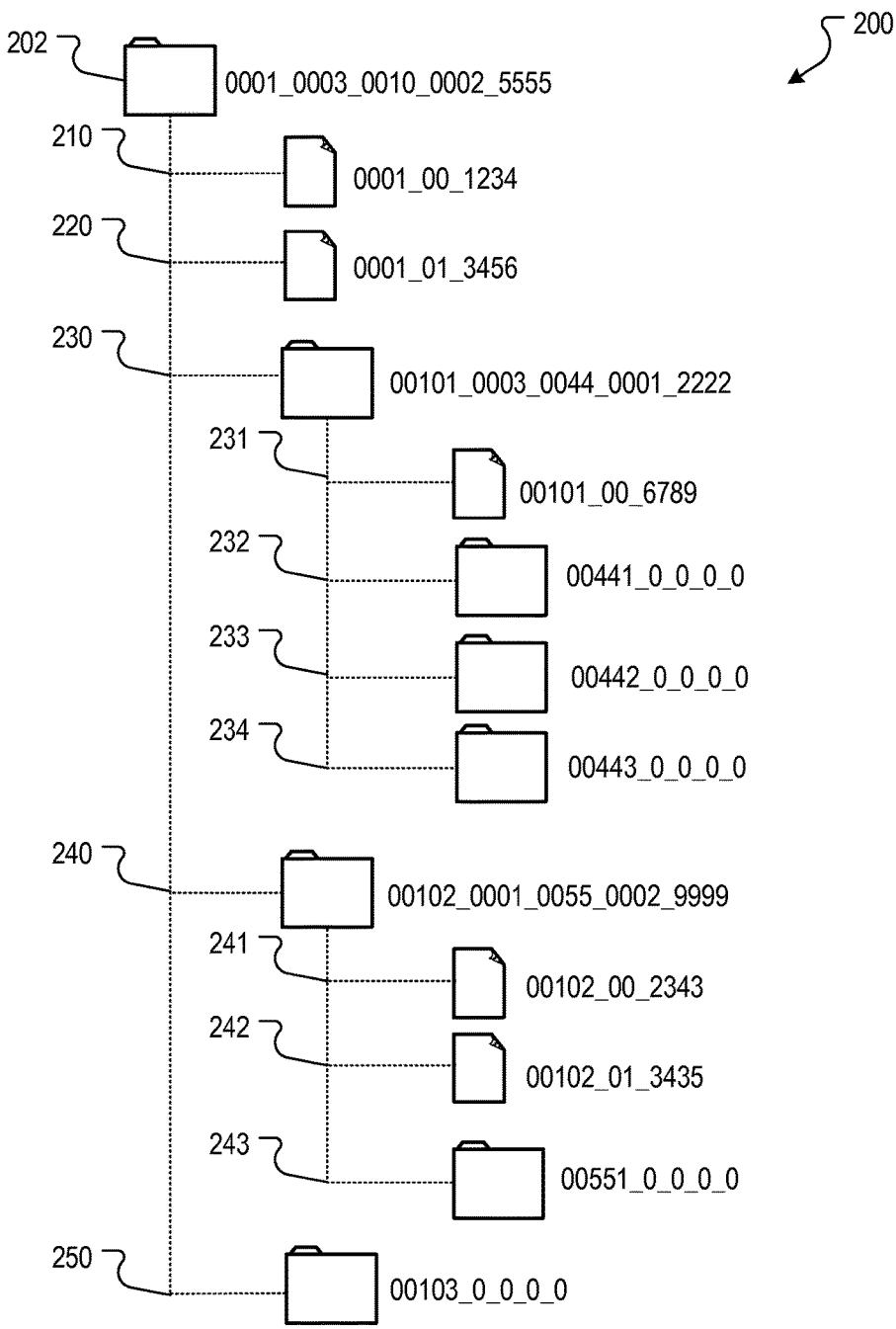
FIG. 2 is a diagram of a test directory structure and test files stored in a logical storage.
Figure 3A:
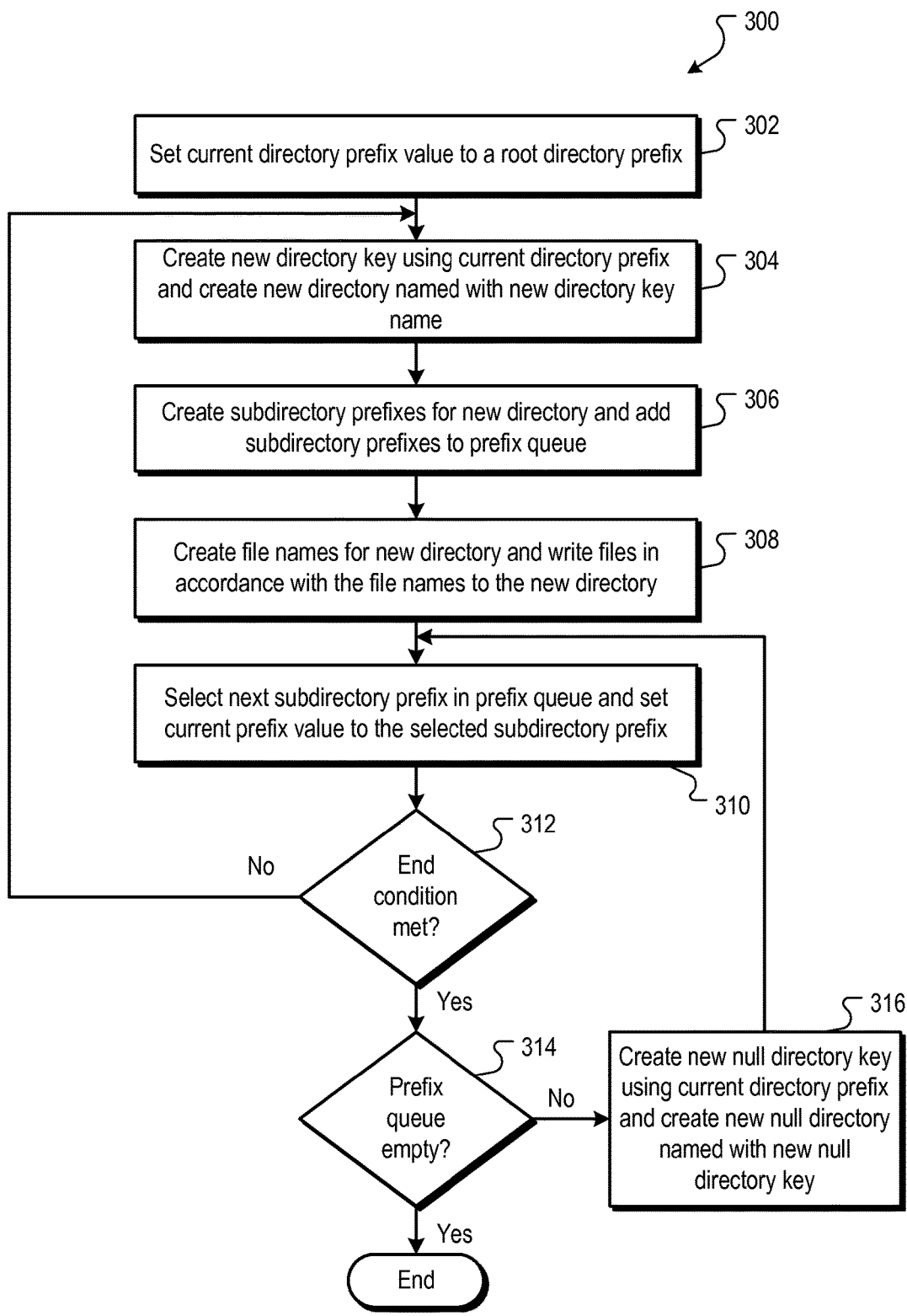
FIG. 3A is a flow diagram of an example process for creating the test directory structure and test files of FIG. 2.
Figure 3B:
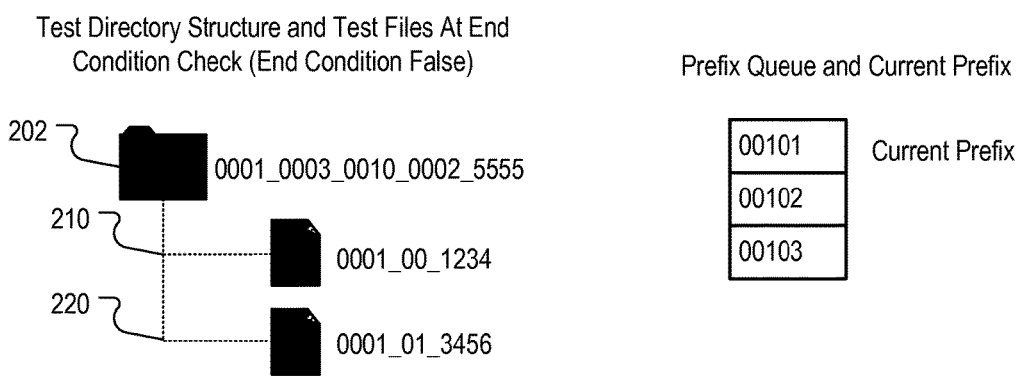
FIGS. 3B-3I are diagrams of the test directory structure during various stages of the process of FIG. 3A.
Figure 3C:
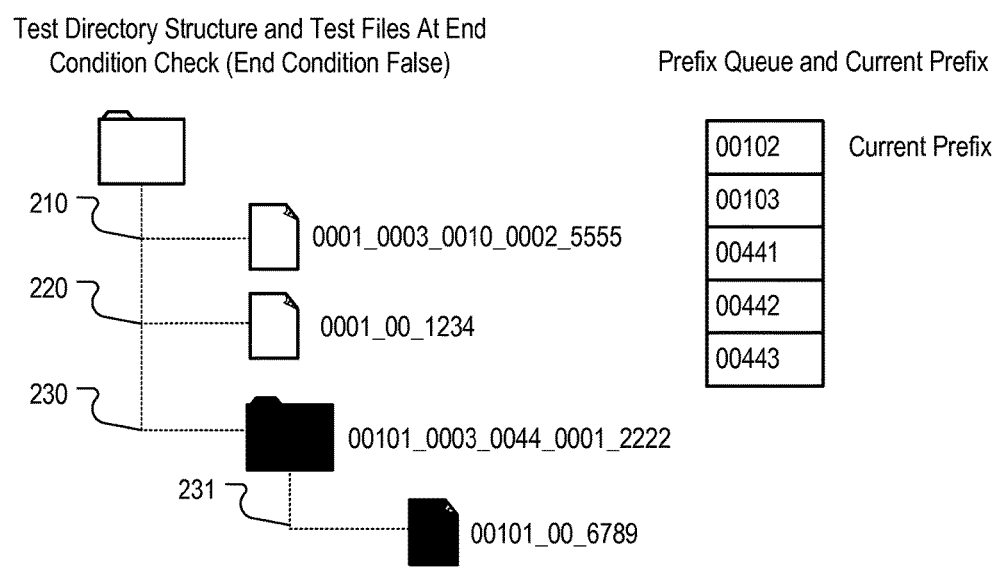

The building of a test directory structure and test files stored in the test directory structure is described with respect to FIGS. 2 and 3A-3I. FIG. 2 is a diagram of a test directory structure 200 and test files stored in a logical storage. FIG. 3A is a flow diagram of an example process 300 for creating the test directory structure and test files of FIG. 2, and FIGS. 3B-3I are diagrams of the test directory structure 200 during various stages of the process 300 of FIG. 3A.

The test directory structure and test files 200 of FIG. 2 are created by an iterative process. In particular, a root directory is created first in the logical storage, and subdirectories and files are created in a breadth-first manner so that the corresponding directory tree grows across neighboring subdirectories before descending into another subdirectory. Additionally, after each directory is created, test files are created and stored in that directory. For example, in FIG. 2, the root directory 202 is created first, and the test files 210 and 220 are written to the root directory 202. Thereafter, the subdirectory 230 is created, and the test file 231 is written in the subdirectory 230. After the test file 231 is written, the subdirectory 240 is created, and the test files 241 and 242 are written in the subdirectory 240.

Additionally, when each subdirectory is created, one or more subdirectory prefixes are created for that subdirectory. The subdirectory prefixes are stored in this prefix queue and are pulled from the prefix queue for creating subdirectories within a respective parent directory.

This process is better understood with reference to the name format of each directory. In particular, each directory name is of the following format:

<prefix>_<subdirectory>_<subdirectory prefix>_<file>_<content>

The prefix value is a first value in the directory name. For example, in FIG. 2, the root directory 202 has a subdirectory prefix value of 0001.

The subdirectory value is a second value in the directory name and defines a number of immediate subdirectories in the subdirectory. As used herein, an immediate subdirectory of a directory is the next subdirectory in a path of the directory and subdirectory. For example, for the following path:

/dir1/dir2/dir3/dir4/

The directory dir2 is an immediate subdirectory of dir1, and the directories dir3 and dir4 are not immediate subdirectories of dir1. Likewise, the directory dir3 is an immediate subdirectory of dir2, and the directory dir4 is not an immediate subdirectory of dir3. Finally, the directory dir4 is an immediate subdirectory of dir3.

As a directory may have multiple subdirectories, any directory may have multiple immediate subdirectories. In the test directory structure 200, the number of immediate subdirectories in any given directory corresponds to the subdirectory value in the name of the given subdirectory. For example, with respect to FIG. 2, the root directory has a subdirectory directory value of 0003, and thus includes three immediate subdirectories 230, 240 and 250. Likewise, the subdirectory 230 has a subdirectory value of 0003, and thus includes the immediate subdirectories 232, 233 and 234; and the subdirectory 240 has a subdirectory value of 0001, and thus includes only one immediate subdirectory 243. Finally, the directories 232, 233, 234, 243 and 250 each have a subdirectory value of zero and thus do not include any subdirectories.

The subdirectory prefix value is a third value in the directory name that defines a prefix value of each directory name of each immediate subdirectory in the directory. For example, the root directory 202 as a subdirectory prefix value of 0010. Thus, each immediate subdirectory begins with the prefix value of 0010. In some implementations, the prefix value of each immediate subdirectory can be respectively incremented, e.g., incremented by unit value or appended with the count number. For example, in the test directory structure 200, the prefix value of each subdirectory is the subdirectory prefix value of its parent directory appended by a count number. For example, the subdirectory 230 was the first subdirectory created in the directory 202, and thus its prefix value is the subdirectory prefix value of the directory name of the directory 202 appended with a count number of 1, i.e., 00101. Similarly, the subdirectory 240 was a second subdirectory created in the directory 202, and thus its prefix value is a subdirectory prefix value at the directory name of the directory 202 appended with a count number of two, i.e., 00102.

The file value is a fourth value in the directory name that defines the number of files stored in the directory. As the test directory structure 200 is created in a breadth first manner, the file value defines only the number of files stored in the subdirectory and does not define the number of files stored in all subdirectories of that directory. For example, in the test directory structure 200, the root directory 202 has a file value of 0002, corresponding to the files 210 and 220. The file value 0002 does not take into account the files 231, 241 and 242 that are stored in other subdirectories of the root directory 202.

In some implementations, each directory name can include a content value. The content value is a value that is used to determine the content of files stored in the directory. The content value can, for example, be used as a seed input to a pseudo-random number generator that is used to generate random data that are stored in files. Alternatively, the content value can be used to determine a portion of a file name of files that are stored in the directory.

The content of a test file is better understood with reference to the name format of each test file. In particular, each file name is of the following format:

<file prefix>_<count>_<size>

The file prefix value is a value based on the directory in which the file is stored. In some implementations the file prefix value is equal to the prefix value of the directory in which the file is stored. For example, with respect to the root directory 202, which has a prefix value of 0001, each file has a file prefix value of 0001. Likewise, with respect to the subdirectory 230, which has a prefix value of 00101, the file 231 has a prefix value of 00101. The account number is the file count of a particular file, and is incremented for each new file that is created. For example, the file 210 has account number 00, indicating that it was the first file created in the directory 202, while the file 220 has account number 01, indicating that it was the second file created in the directory 202.

The size value is a value that defines the size of the file. In some implementations, the size value defines the size of a file in the number of storage units of the filing system, e.g., bytes or blocks.

The contents of each file can be determined from the file name, or, alternatively, a portion of the file name and the content value of the directory name of the directory in which the file is stored. For example, the size value for the file name can be used as a random seed input into a pseudo-random number generator that outputs a random byte. Alternatively, the size value of the filename can be combined with the content value of the directory name in which the file is stored to generate a random seed that is input into a pseudo-random number generator that outputs a random byte.

In some implementations, the random byte is repeated in the file contents until the file size equals the file size defined by the size value of the filename, at which time the file is closed and written. Alternatively, each random byte can be used as a subsequent random seed input to the pseudo-random number generator to generate a new random byte for a file. This process is repeated until the file size equals the file size defined by the size value of the filename, at which time the file is closed and written.

Finally, several of the subdirectories have null values, e.g., 0, as subdirectory values, subdirectory prefix values, file values, and content values. These null values are generated in response to an end condition being met. The generation of these null values are described with reference to FIG. 3A below.

The example directory name formats and filename formats described above are not exhaustive, and other formats could be used. For example, the order of the values in each format can be rearranged, e.g., the prefix value can instead be a suffix value that defines the very last portion of each directory name.

In some implementations, the values can be random values generated by a pseudo-random number generator. In some implementations, the prefix value of the root directory 202 can be specified by user. The prefix value can then be used as a seed input to the pseudo-random number generator to obtain a random number. The random number can be used for the next random number required, e.g., as a subdirectory value of the root directory. This number can then, in turn, be used as another seed input to the pseudo-random number generator to obtain another random number, which can then be used as the next random number required, e.g., as subdirectory prefix value of the root directory 202. The process of using random numbers can continue until an end condition is met.

In other implementations, the values can be random values generated by a pseudo-random permutation generator that generates a series of unique numbers for a cycle length. The cycle length is preferably large enough to account for all random permutations necessary to build the test directory, i.e., large enough to ensure that the cycle will not be completed before an end condition is met. In some implementations, the prefix value of the root directory 202 can be specified by user. The prefix value can then be used as a seed input to the pseudo-random permutation generator to obtain a random permutation. The process of using random permutations can continue until an end condition is met.

In some implementations, the directory names are key names, and the values of the key names are deterministic of the number of immediate subdirectories stored in the directory, at least a portion of the directory key name of each subdirectory, the number of files stored in the directory, and at least a portion of the file name of each file stored in the subdirectory. Accordingly, the contents of each directory, i.e., the names of the immediate subdirectories, the number of the immediate subdirectories, the names of the files stored in directory, the number of files stored in the directory, and the contents of the file stored in the directory can be evaluated based on the key name of the directory. This evaluation can be used to determine whether a data storage error has occurred, and the type of data storage error that occurred. This evaluation processes described with respect to FIG. 4 below.

FIG. 3A is a flow diagram of an example process 300 for creating the test directory structure and test files of FIG. 2. The example process 300 can be implemented in the data storage test engine 132.

The process 300 sets a current directory prefix value to the root directory prefix value (302). A current directory prefix value is a prefix value of the directory that is to be created and designated as a current directory. As used herein, a current directory is a directory that a system is working in at any current time. In other words, a current directory is a directory that is dynamically associated with a given process at a current time; e.g., a write command will cause the process to write a file in the current directory, etc. The current directory prefix value can be input by a user, can be randomly generated by a pseudo-random number generator, or can be obtained from a configuration file.

The process 300 creates a new directory key using the current directory prefix and creates a directory named with the new directory key name (304). As this is the first iteration through the process 300, the new directory is a root directory. The root directory is the highest level directory in a logical space being tested. The directory key name will include the prefix value, a subdirectory value, subdirectory prefix value, a file value, and, optionally, a content value. In some implementations, each of the values can be random numbers generated by the pseudo-random number generator.

The process 300 creates subdirectory prefixes for the new directory and adds a subdirectory prefixes to a prefix queue (306). As the directory structure is being generated breadth first, immediate subdirectories are not initially created within a directory. Instead, directory prefixes for the immediate subdirectories are stored in a prefix queue and pulled from the queue at the time the immediate subdirectories are to be created.

Queuing of the subdirectory prefixes facilitates an iterative (e.g., recursive) building of the test directory structure in a breadth first manner. As the name of each subdirectory is determinative of the contents of that subdirectory, a check is made before each subdirectory is created to determine if a stop condition has occurred. Whether a stop condition has occurred will affect the contents of the subdirectory, and thus the name of the subdirectory will likewise be affected.

Accordingly, the key names of subdirectories are generated as the subdirectories are created, thus, the subdirectory prefixes are stored in a prefix queue. For example, with respect to the test directory structure 200, after the root directory 202 is created, the prefix queue would include the subdirectory prefix values of 00101, 00102 and 00103. In some implementations, the prefix queue can store the prefix of the entire path of the eventual subdirectories to be created, e.g.:

0001_0003_0010_0002_5555/00101
0001_0003_0010_0002_5555/00102
0001_0003_0010_0002_5555/00103

Storing of the entire path facilitates the creation of subdirectories relative to the root directory 202. Additionally, storing of the entire path also eliminates ambiguities that could occur when a particular random number is generated more than once during the building of the test directory structure.

In other implementations, only subdirectory prefix values are stored, and as each prefix value is pulled it is compared to the prefix values of subdirectories in the test directory structure 200 to identify a correct parent directory. In such implementations, use of a pseudo-random permutation generator can ensure there are no collisions of subdirectory prefix values, provided the cycle length of the pseudo-random permutation generator is large enough so that it is not exhausted before an end condition is met.

The process 300 creates filenames for the new directory and writes files in accordance with the filenames to the new directory (308). The file names and the contents of the file can be generated as described above with reference to the file name format.

The process 300 selects the next subdirectory prefix in the prefix queue and sets the current prefix value to the selected subdirectory prefix (310). For example, after the files 210 and 220 have been written in the root directory 202, subdirectory prefix value 00101 is pulled from the prefix queue and set to the current prefix value.

The process 300 determines if an end condition has been met (312). An end condition can be specified by a user and a variety of end conditions can be specified. For example, an end condition can be a maximum directory tree depth; a maximum allocation (e.g., full percentage) of a logical space; a maximum number of files created; a maximum number of directories created; a maximum number of bytes or blocks allocated; a time limit; or any combination of the example end conditions above. Other end conditions can also be used.

If an end condition has not been met, the process 300 creates a new directory key using the current directory prefix and creates a new directory named with the new directory key name. For example, with respect to FIG. 2, the directory key name "00101_0003_0044_0001_2222" is created and the directory 230 named with that key name is also created.

The process 300 continues until an end condition is finally met. FIGS. 3B-3I illustrate how the test directory structure 200 is constructed during various stages of the process 300. FIGS. 3B-3I are arranged according to subsequent iterations and the directories and test files that have been created during any one iteration are depicted in a dark fill. Each of the figures illustrate that the process 300 iteratively selects subdirectory prefix values that are next in the prefix queue as prefix values for new directories. In response to each selection prior to an end condition occurring, as shown in FIGS. 3A-3D, the process 300 generates respective subdirectory values, subdirectory prefix values, and a file value for the new directories and stores the plurality of subdirectory prefix values in the prefix queue. New directories with respective directory key names comprising the prefix values, the subdirectory values, the subdirectory prefix values, and the file values are created and files are written to the new directories.

However, in response to the end condition being met, the process 300 determines if the prefix queue is empty (314). If the prefix queue is not empty, the process 300 creates a null directory key using the current directory prefix and creates a new null directory named with the new null directory key (316).

Figure 3D:
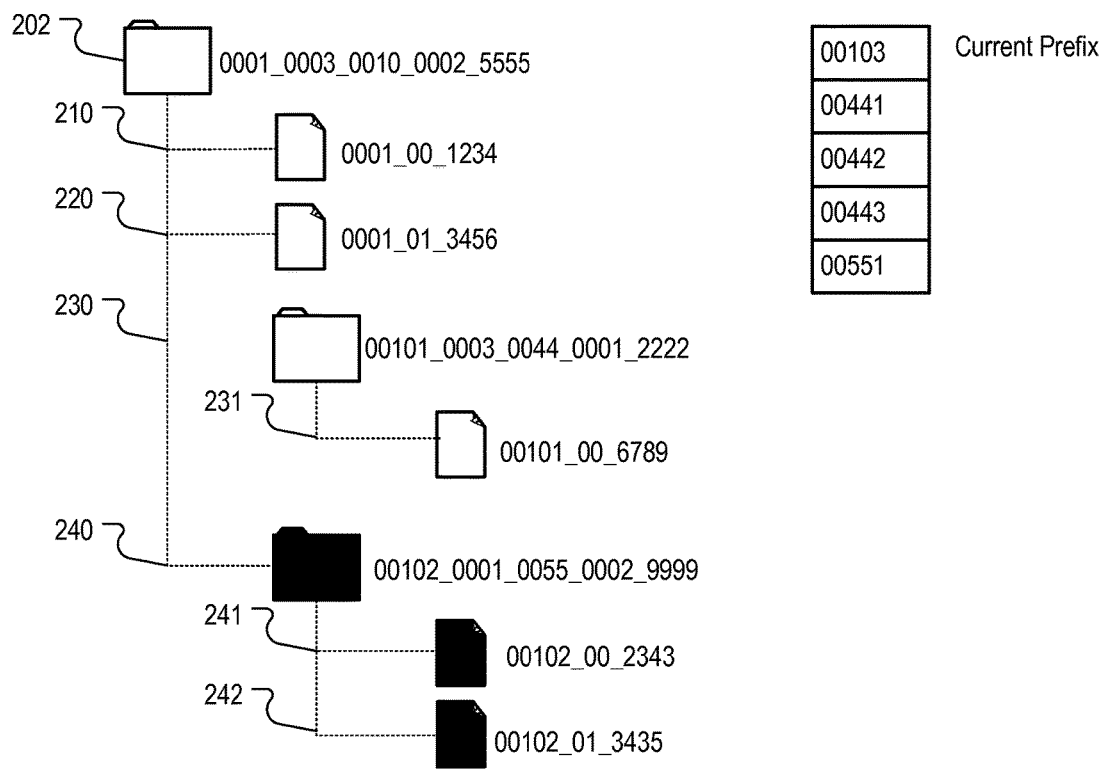
Figure 3E:
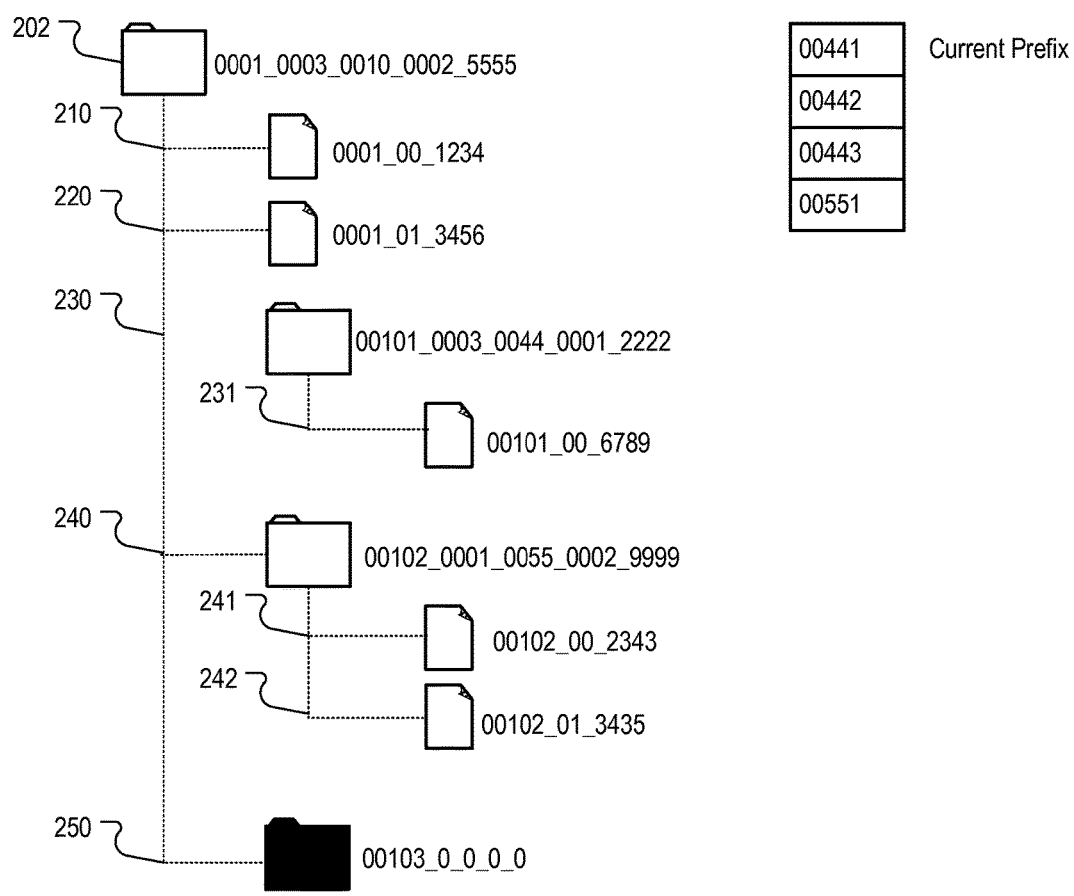
Figure 3F:
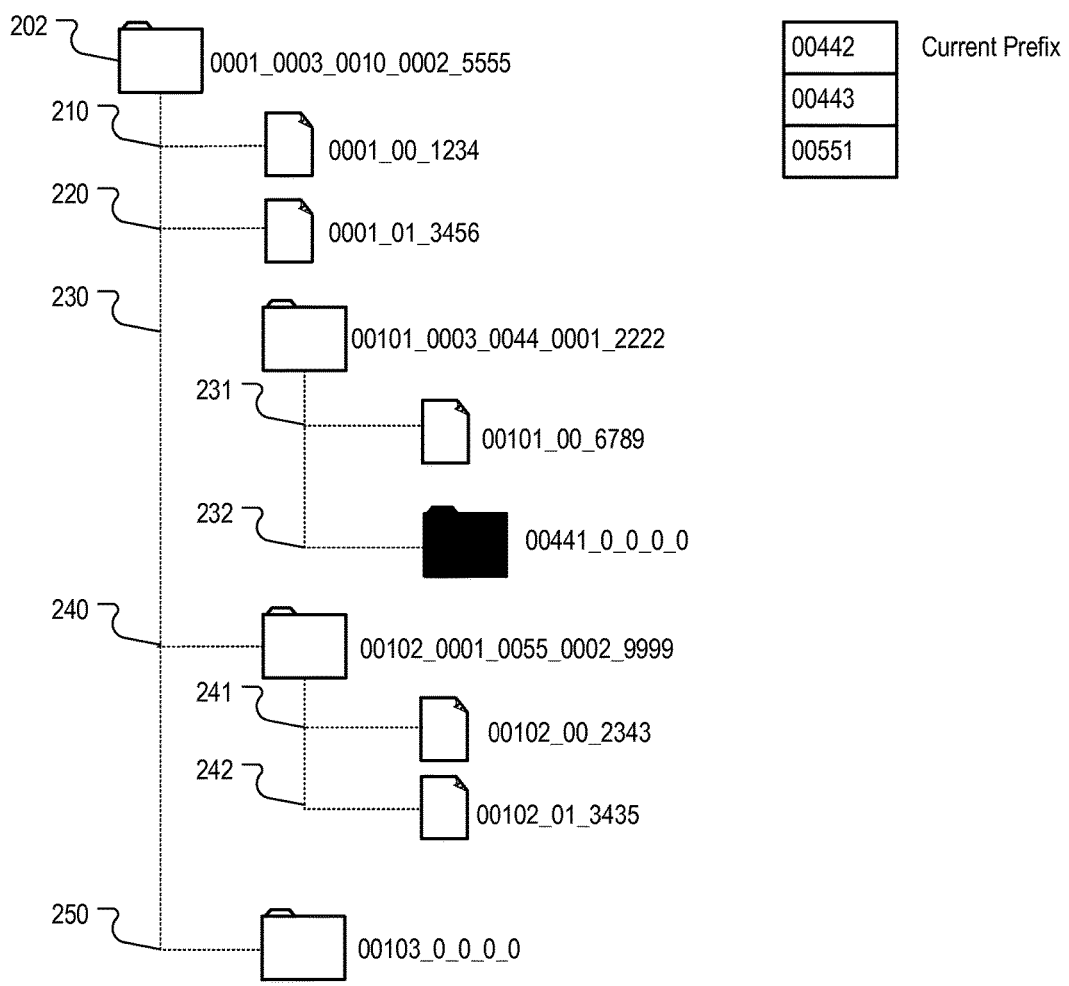
Figure 3G:
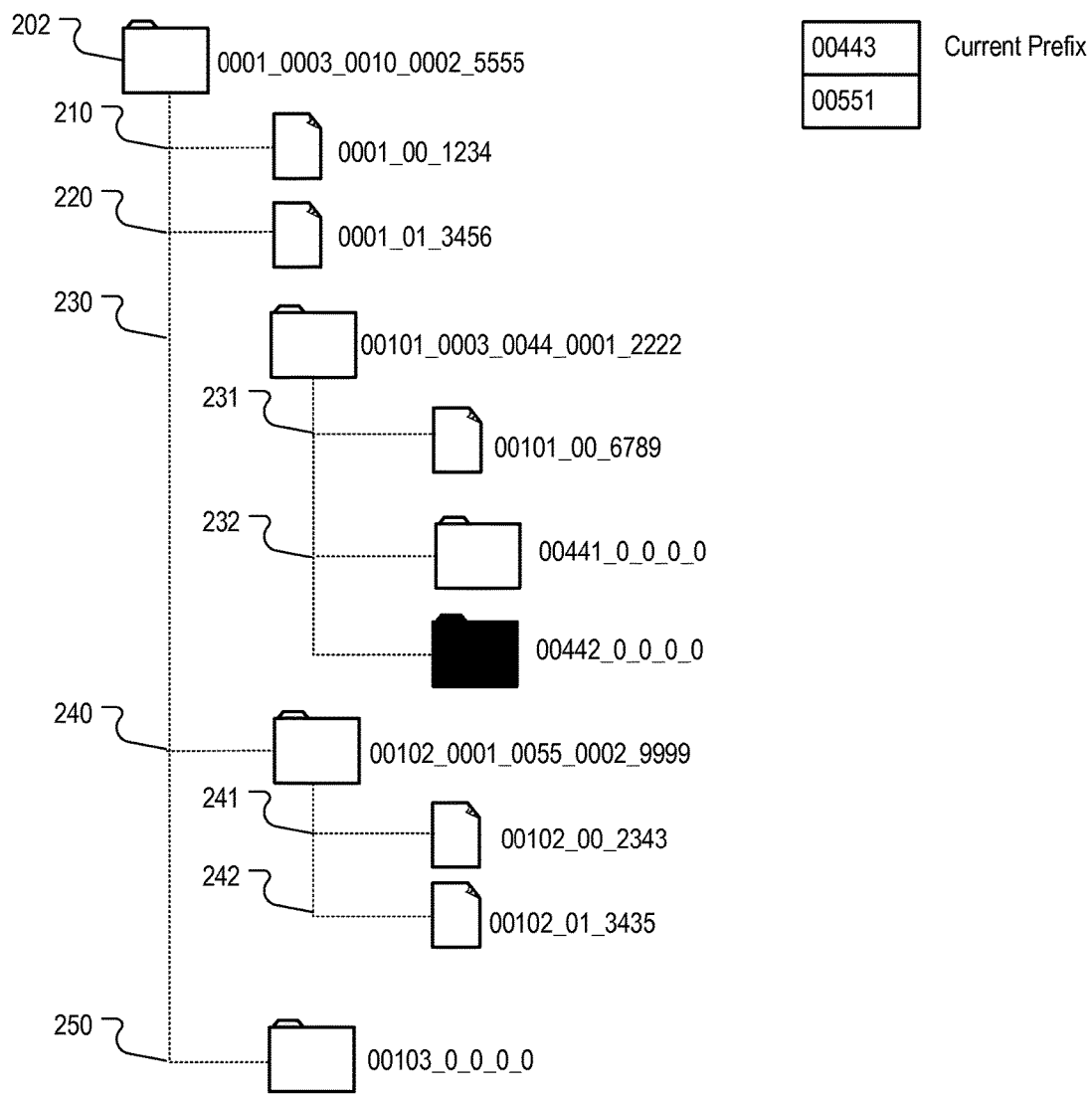
Figure 3H:
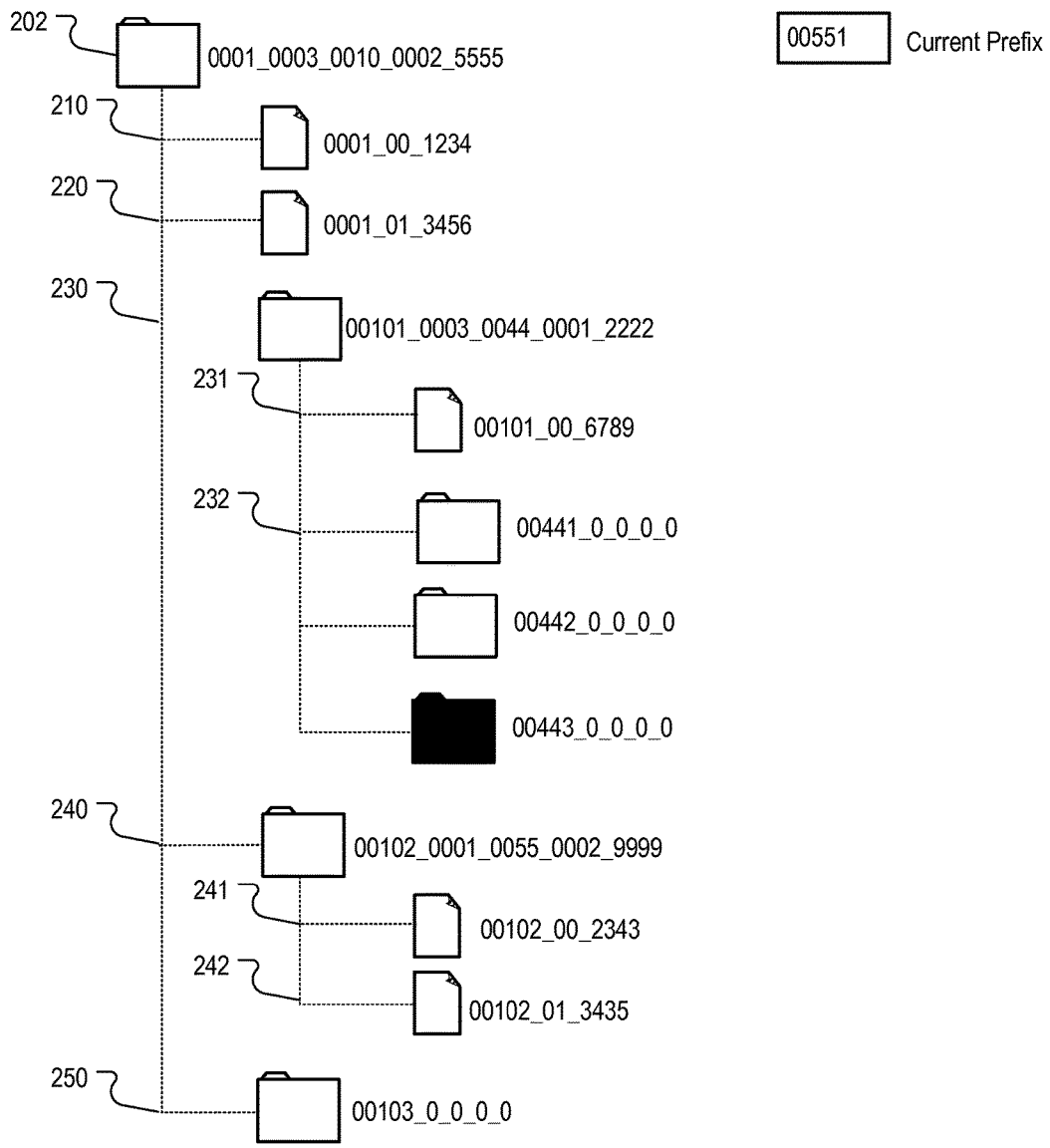

For example, with respect to FIG. 3D, the current prefixes selected from the prefix queue is 00103. However, the process 300 has determined that an end condition has been met (e.g., the logical store has been filled to a predetermined percentage), and thus the process 300 creates a null directory key of "00103_0_0_0_0" and creates a null directory 250 (shown in FIG. 3G) named with the new directory key.

A null directory can be considered a leaf directory that has no immediate subdirectories. It is possible that a null directory can also be created prior to an end condition occurring, e.g., a pseudo-random number generator generates a value of zero for a subdirectory value. However, after an end condition has been met, all directories that are created are null directories. Furthermore, each null directory has a zero value for the directory value, and thus the process 300 will not add subdirectory prefix values to the prefix queue. In some implementations, each of the subdirectory values, subdirectory prefix values, file values and content values of the null directories are zero. Accordingly, the process 300 will not create files in null directories.

Figure 3I:
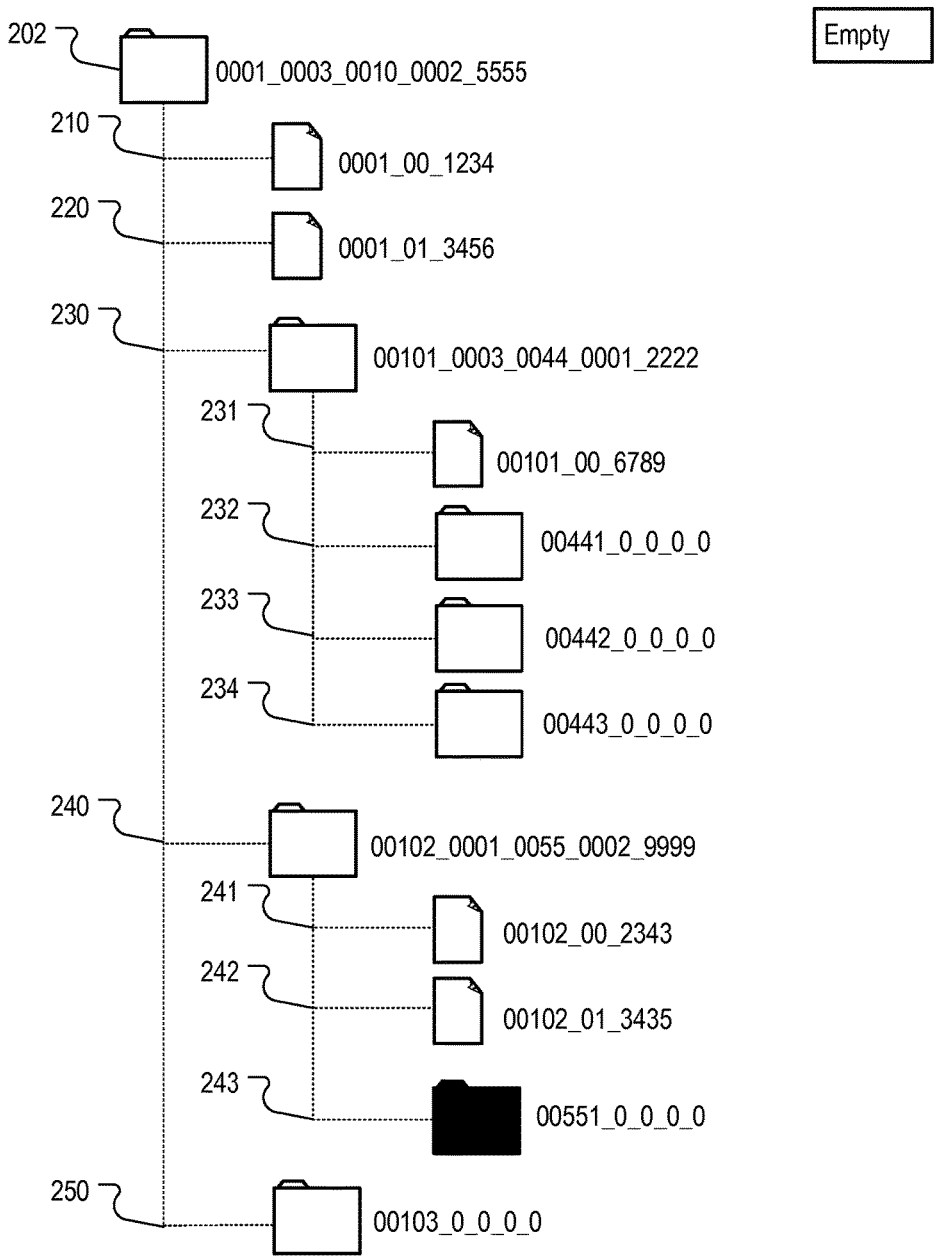

After the null directory is created, the process 300 selects the next subdirectory prefix value in the prefix queue and sets the current prefix value to the selected subdirectory prefix (310). The process 300 continues until the prefix queue is empty, at which time the process 300 ends. The corresponding end state of the process 300 and the resulting test directory structure is shown in FIG. 3I.

Figure 4:
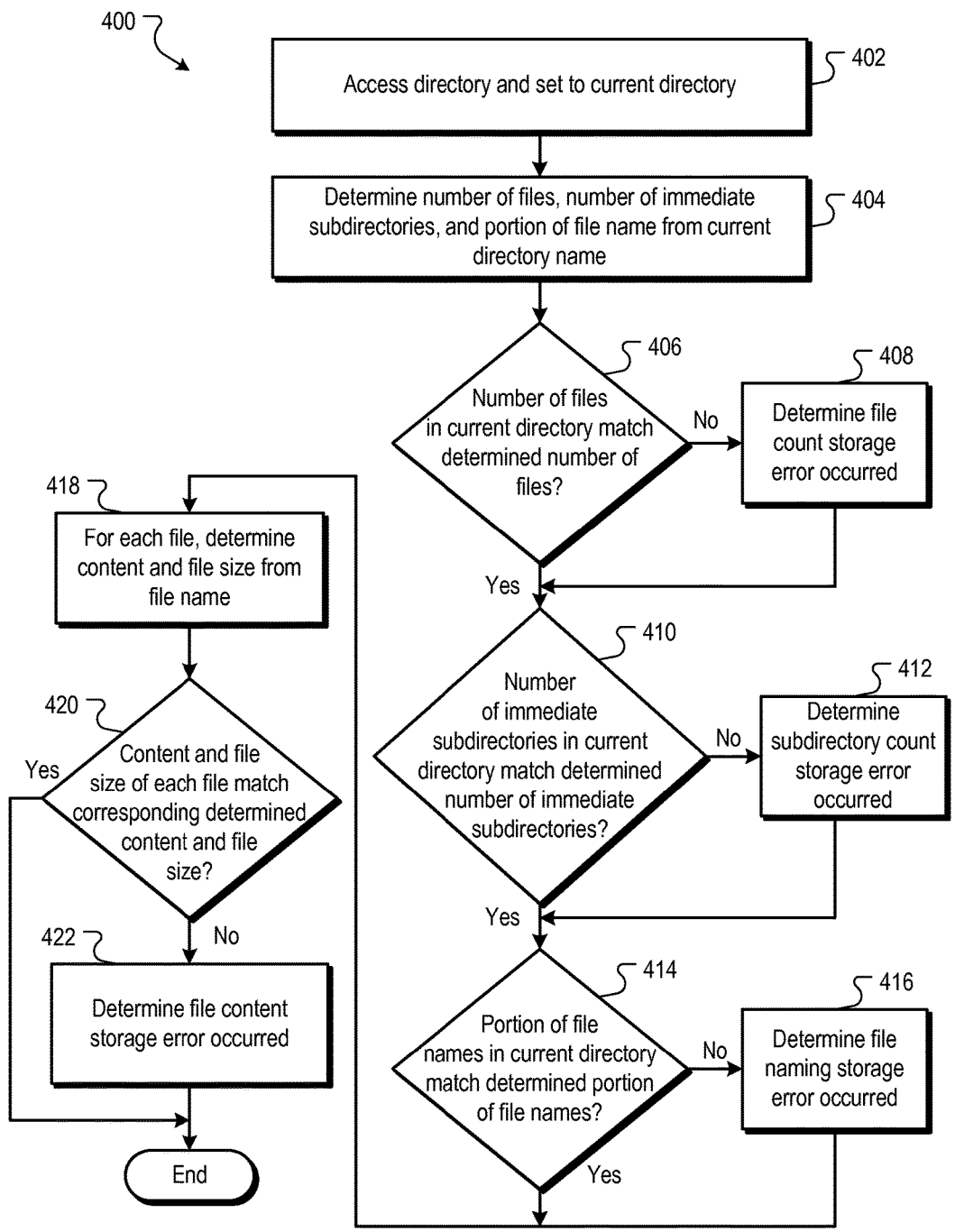
FIG. 4 is a flow diagram of an example process for testing a test directory structure and test files for errors.

FIG. 4 is a flow diagram of a process 400 for testing test directory structure and test files for errors. The example process 400 can be implemented in the data storage test engine 132.

The process 400 accesses a directory and sets the directory to a current directory (402). For example, the process 400 can access one of the directories of FIG. 2.

The process 400 determines a number of files, the number of immediate subdirectories, and a portion of file names from the current directory name (404). For example, the process 400 can parse the name of the current directory to identify the prefix value, the subdirectory value, subdirectory prefix value, and the file value. Each of these values can be used during the process of building the test directory and test files and thus can be deterministic of the immediate subdirectories and test files stored in the current directory.

The process 400 determines if the number of files in the current directory match the determined number of files (406). For example, with respect to the directory 202, the file value is 0002. The process 400 will determine whether there are two files stored in the directory 202. If the number of files in the current directory do not match the determined number files, the process 400 determines that a file count storage error has occurred (408).

The process 400 determines if the number of immediate subdirectories in the current directory match the determined number of immediate subdirectories (410). For example, with respect to the directory 202, the directory value is 0003. The process 400 will determine whether there are three immediate subdirectories in the directory 202. If the number of immediate subdirectories in the current directory do not match the determined number of immediate subdirectories, then the process 400 determines that the subdirectory count storage error has occurred (412).

The process 400 determines if a portion of the file name in the current directory matches the determined portion of the file name (414). For example, with respect to the directory 202, the prefix value is 0001, and the prefix value is used to name files stored in the directory. Accordingly, the process 400 will determine if the files 210 and 220 begin with the prefix value 0001. If the process 400 determines a portion of a file name in the current directory does not match the determined portion of the file name, then the process 400 determines that a file naming storage error has occurred (416).

The process 400 determines, for each file, the content and file size of the file name 418). For example, the process 400 can parse the file name to determine the file size value. Furthermore, the process 400 can use one or more of the directory name values and/or file name values to regenerate the content of the file.

The process 400 determines if the content and file size of each file match the corresponding determined content and file size (420). For example, the determined file size value and contents can be compared to the actual file size value in content to determine if there is a match. If the content and file size of each file do not match the corresponding determine content and file size, then the process 400 determines a file content storage error occurred (422).

The process then ends, and any errors are reported to the user.

Although the process 400 has been described with respect to a single subdirectory, the process 400 can be implemented in a manner similar to the process 300, i.e., the process 400 can iterate through the entire directory tree structure and interrogate each directory and subdirectory to determine if there are any data storage errors.

Figure 5:
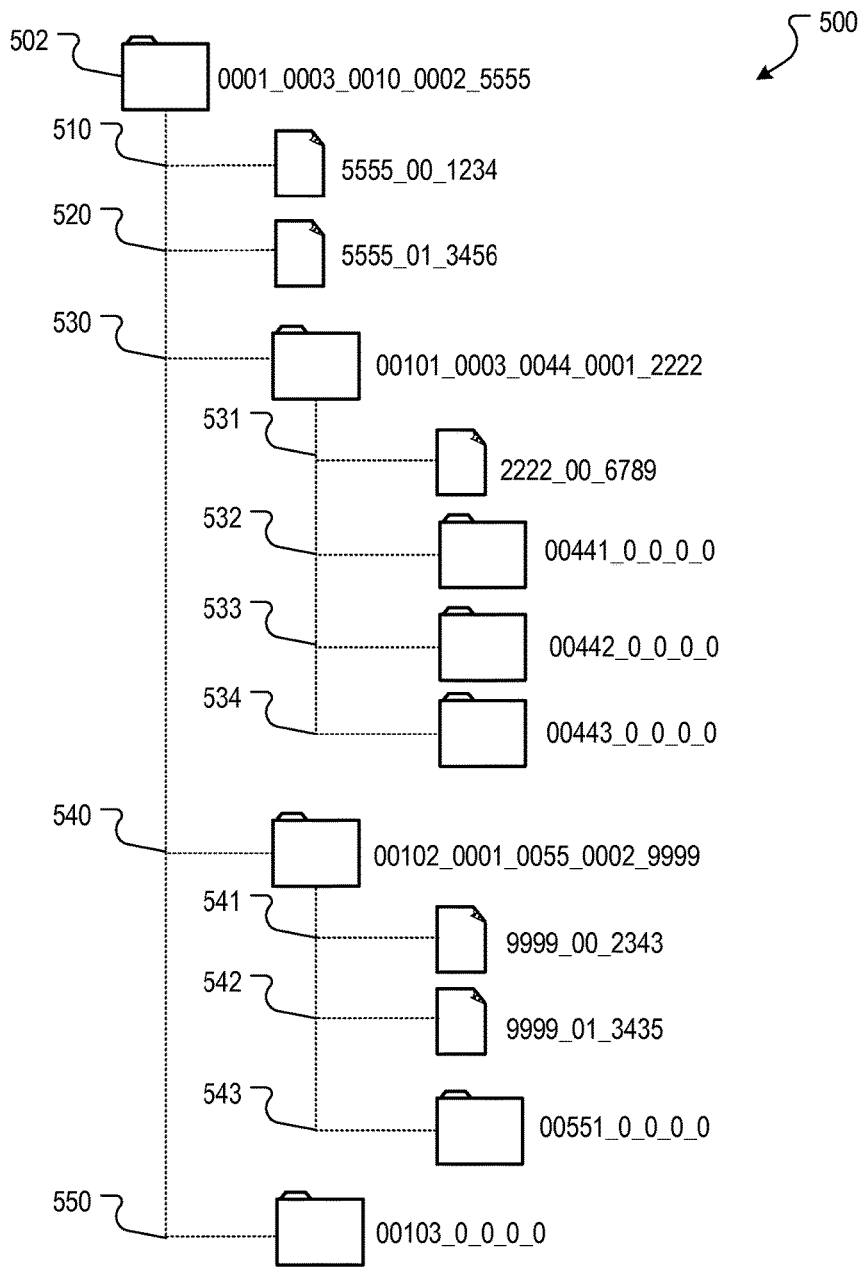
FIG. 5 is a diagram of another test directory structure and test files stored in a logical storage.

The test directory structure and processes described above are examples only and not limiting. For example, the naming convention of files and/or directories can be modified, so long as the naming convention provides a means by which the expected contents of the test directory structure can be determined and checked against the actual contents. FIG. 5 is a diagram of another test directory structure 500 and test files stored in a logical storage. The structure 500 is similar to the structure 200, expect that the content value of the name format of the directory is used to both name and determine the content of files stored in the directory. The content value can, for example, be used as a seed input to a pseudo-random number generator that is used to generate random data that are stored in the files.

Furthermore, the order and placement of each value in the directory name format or file name format can vary. For example, alternative formats of a directory name include:

<subdirectory>_<prefix>_<subdirectory prefix>_<file>_<content>
<content>_<prefix>_<subdirectory prefix>_<file>_<subdirectory>
<prefix>_<file>_<subdirectory>_<content>_<subdirectory prefix>

In some implementations, the data storage test engine 132 can specify random attributes for a file. For example, the file name can be used to determine file permissions and file types, such as whether the file is read only, read and writable, a data file (e.g., a file name ending in a "dat" extension), an executable file (e.g., a file name ending in an "exe" extension), and so on. In some implementations, the data storage test engine 132 can generate an attribute vector and append the attribute vector to the file name. The attribute vector can be a binary vector that specifies file attributes. For example, the following attribute vector format

[(RO=0, RW=1), (data=0, executable=1), (system=0, hidden=1)]

defines a three-bit vector in which the first bit determines whether a file is read only; the second bit determines if the file is a data file or an executable file; and the third bit determines if the file is a system file or a hidden file. Thus, the file having the name "1611_003_226_001" is a read-only data file that is hidden, as defined by the three bits appended to the file name "1611_003_226."

The data storage test engine 132 can randomly determine the attribute vector, or, alternatively, the attribute vector can be the result of a function that uses the file name as input. For example, the numbers of the file name can be summed and divided by 8; the remainder can be used to determine file attributes (e.g., determine a three-bit attribute vector).

Figure 6:
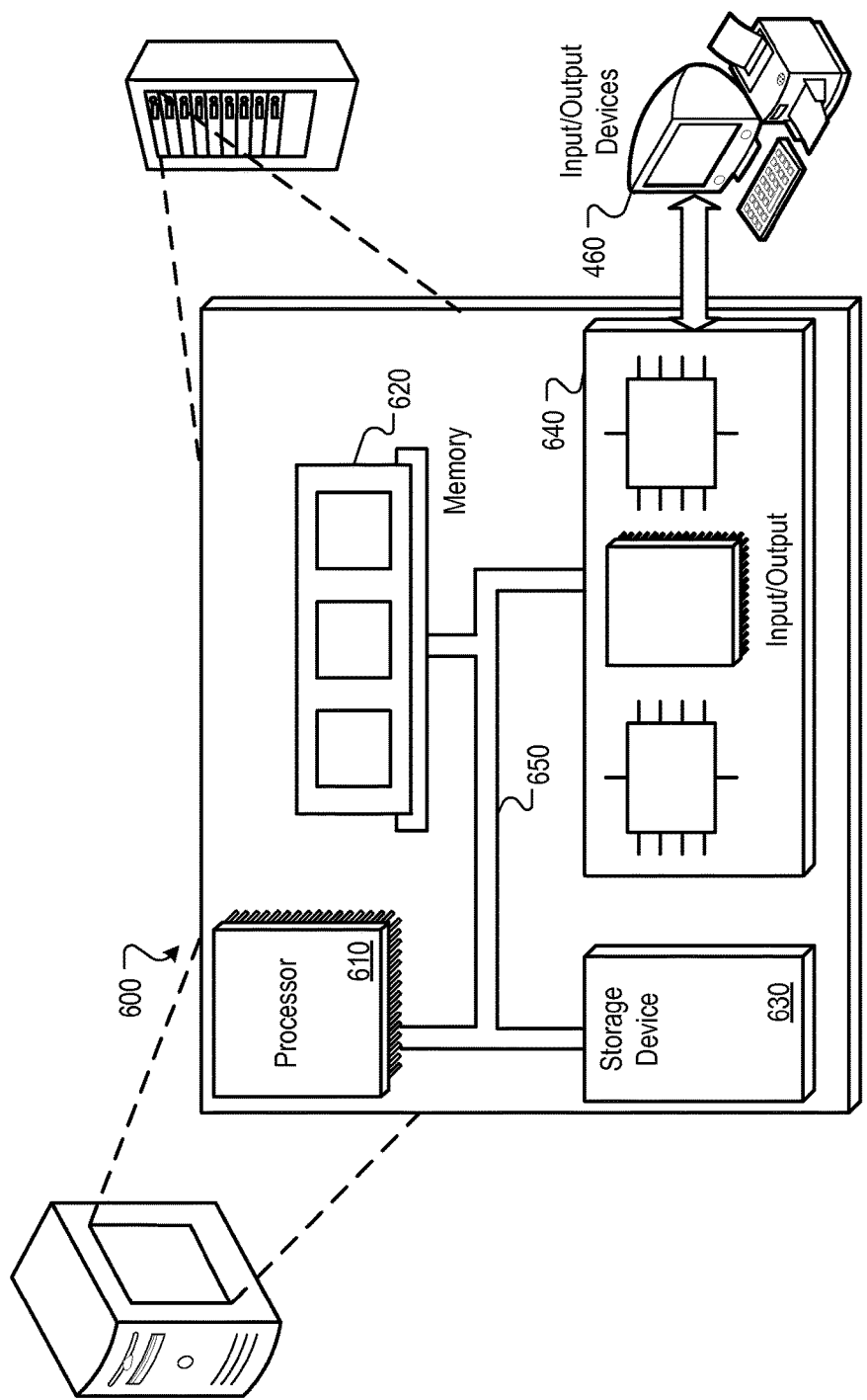
FIG. 6 is a block diagram of an example computer architecture.

FIG. 6 is a block diagram of an example computer architecture 600. The architecture 600 can be used to implement client devices and server devices described above. The architecture 600 includes a processor 610, a memory 620, a storage device 630, and an input/output device 640. Each of the components 610, 620, 630, and 640 can be interconnected, for example, using a system bus 650. The processor 610 is capable of processing instructions for execution. In one implementation, the processor 610 is a single-threaded processor. In another implementation, the processor 610 is a multi-threaded processor. The processor 610 is capable of processing instructions stored in the memory 620 or on the storage device 630.

The memory 620 stores digital information. In one implementation, the memory 620 is a computer-readable medium. The memory 620 can include a volatile memory unit and non-volatile memory unit.

The storage device 630 is capable of providing mass storage. In various different implementations, the storage device 630 can include, for example, a hard disk device, an optical disk device, or some other large capacity storage device. The storage device 630 can also be a logical storage 120 of the network storage system 110.

The input/output device 640 provides input/output operations. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660.

The examples described above are illustrative only and are not limiting. Modification variations of the subject matter described above can be implemented without departing from the spirit and scope of the disclosure. For example, instead of doing a breadth first building and testing of the test directory structure, the directory structure and corresponding files can be built and tested in a depth first manner down to a maximum depth. Additionally, although only one root directory per logical storage is described, there can be multiple root directories and corresponding separate directory structures, i.e., there can be two or more top-level directories in a particular logic store undergoing data storage testing.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination with a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
 a data processing apparatus;
 a data store in data communication with the data processing apparatus and storing instructions encoded on a computer readable medium, the instructions executable by the data processing apparatus and operable to cause the data processing apparatus to perform operations comprising:
  accessing a data storage system in data communication with the data processing apparatus;
  creating a plurality of directories in a logical storage in the data storage system, the directories including a root directory and a plurality of subdirectories in the root directory, each directory having a directory key name comprising:
   a prefix value;
   a subdirectory value, the subdirectory value being a number defining a total number of immediate subdirectories in the directory;
   a subdirectory prefix value, the subdirectory prefix value defining a prefix value of each directory key name of each immediate subdirectory in the directory; and
   a file value, the file value being a number defining a total number of files stored in the directory.

2. The system of claim 1, wherein the prefix value, subdirectory value, subdirectory prefix value and file values are each based on respective outputs of a pseudo-random number generator.

3. The system of claim 1, wherein:
 the subdirectories include leaf directories that have no subdirectories; and
 the subdirectory value for the directory key name for each leaf directory is a null value that defines zero immediate subdirectories in the leaf directory.

4. The system of claim 1, wherein creating the plurality of directories comprises the operations of:
 creating a prefix queue;
 generating a prefix value for a new directory;
 generating a subdirectory value, a subdirectory prefix value, and a file value for the new directory;
 creating the new directory with a directory key name comprising the prefix value, the subdirectory value, the subdirectory prefix value, and the file value;
 selecting the new directory as a current directory;
 creating a plurality of subdirectory prefix values based on the subdirectory value and the subdirectory prefix value directory key name of the current directory;
 storing the plurality of subdirectory prefix values in the prefix queue; and
 writing a number of files in the current directory, the number of files defined by the file value in the directory key name of the current directory.

5. The system of claim 4, wherein creating the plurality of directories further comprises the operations of:
 iteratively selecting subdirectory prefix values that are next in the prefix queue as prefix values for new directories, generating respective subdirectory values, subdirectory prefix values, and file value for the new directories, storing the plurality of subdirectory prefix values in the prefix queue, and creating the new directories with respective directory key names comprising the prefix values, the subdirectory values, the subdirectory prefix values, and the file values; and
 determining whether an end condition has occurred after each iteration;
 if an end condition has not occurred, then writing the number of files in a respective current directory defined by the file value in the directory key name of the current directory;
 if an end condition has occurred for an iteration, then creating directories corresponding to only the subdirectory prefix values that are stored in the prefix queue when the end condition is determined to have occurred.

6. The system of claim 5, wherein creating directories corresponding to only the subdirectory prefix values that are stored in the prefix queue when the end condition is determined to have occurred comprises the operations of:
 generating null values for subdirectory values in each iteration subsequent to the determination that the end condition occurred.

7. The system of claim 6, wherein determining whether an end condition has occurred after each iteration comprises determining if a current directory corresponds to a maximum directory path depth.

8. The system of claim 6, wherein each file name is based on:
 a prefix value of the directory in which the file is stored; and
 a size value that defines a size of the file.

9. The system of claim 7, wherein the instructions are further operable to cause the data processing apparatus to perform operations comprising:
 accessing each of the directories, and for each directory:
  determining that a storage error has occurred if the number of files stored in the directory does not match the number of files defined by the file value in the directory key name of the directory; and
  determining that a storage error has occurred if the number of immediate subdirectories in the directory does not match the number of immediate subdirectories defined by the subdirectory value in the directory key name of the directory.

10. The system of claim 9, wherein the instructions are further operable to cause the data processing apparatus to perform operations comprising:
 determining that a storage error has occurred if a portion of each file name of files stored in the directory does not match the prefix value of the directory in which the file is stored.

11. The system of claim 10, wherein the instructions are further operable to cause the data processing apparatus to perform operations comprising:
 determining that a storage error has occurred if the size of each file does not match the size defined by the size value of the file name.

12. The system of claim 6, wherein each directory key name further comprises a content value that is used to determine the content of files stored in the directory, and wherein each file name stored in a directory is based on:

a content value of the directory in which the file is stored; and a size value that defines a size of the file.

13. The system of claim 4, wherein each file name is based on:
   a prefix value of the directory in which the file is stored; and
   a size value that defines a size of the file.

14. The system of claim 13, wherein:
   the size value defines the size of the file in bytes; and
   each byte is random based on the file name.

15. A computer-implemented method, comprising:
   creating a prefix queue in a computer memory;
   generating in the computer memory a prefix value for a new directory;
   generating in the computer memory a subdirectory value that is a number defining a total number of immediate subdirectories in the new directory, a subdirectory prefix value defining a prefix value of each directory key name of each immediate subdirectory to be created in the new directory, and a file value for the new directory that is a number defining a total number of files to be stored in the new directory;
   creating in a logical storage the new directory with a directory key name comprising the prefix value, the subdirectory value, the subdirectory prefix value, and the file value;
   selecting the new directory as a current directory;
   creating in the computer memory a plurality of subdirectory prefix values based on the subdirectory value and the subdirectory prefix value of the directory key name of the current directory;
   storing the plurality of subdirectory prefix values in the prefix queue in the computer memory; and
   writing the number of files in the current directory defined by the file value in the directory key name of the current directory.

16. The method of claim 15, comprising:
   iteratively selecting subdirectory prefix values that are next in the prefix queue as prefix values for new directories, generating respective subdirectory values, subdirectory prefix values, and a file value for the new directories, storing the plurality of subdirectory prefix values in the prefix queue, and creating the new directories with respective directory key names comprising the prefix values, the subdirectory values, the subdirectory prefix values, and the file values;
   determining whether an end condition has occurred after each iteration;
   if an end condition has not occurred, then writing the number of files in a respective current directory defined by the file value in the directory key name of the current directory; and
   if an end condition has occurred for an iteration, then creating directories corresponding to only the subdirectory prefix values that are stored in the prefix queue when the end condition is determined to have occurred.

17. The method of claim 16, wherein creating directories corresponding to only the subdirectory prefix values that are stored in the prefix queue when the end condition is determined to have occurred comprises the operations of:
   generating null values for subdirectory values in each iteration subsequent to the determination that the end condition occurred.

18. The method of claim 16, wherein determining whether an end condition has occurred after each iteration comprises determining if a current directory corresponds to a maximum directory path depth.

19. The method of claim 16, wherein each file name is based on:
   a prefix value of the directory in which the file is stored; and
   a size value that defines the size of the file.

20. The method of claim 19, further comprising:
   accessing each of the directories, and for each directory:
      determining that a storage error has occurred if the number of files stored in the directory does not match the number of files defined by the file value in the directory key name of the directory; and
      determining that a storage error has occurred if the number of immediate subdirectories in the directory does not match the number of immediate subdirectories defined by the subdirectory value in the directory key name of the directory.

21. The method of claim 20, further comprising:
   determining that a storage error has occurred if the portion of each file name of files stored in the directory does not match the prefix value of the directory in which the file is stored.

22. The method of claim 21, further comprising:
   determining that a storage error has occurred if the size of each file does not match the size defined by the size value of the file name.

23. The method of claim 22, wherein:
   the size value defines the size of the file in bytes; and
   each byte is a random byte based on the file name.

24. The method of claim 16, further comprising:
   determining a set of file attributes for a file from a file name of the file; and
   setting the attributes of the file to the determined set of file attributes.

25. A system, comprising:
   a data processing apparatus;
   a data store in data communication with the data processing apparatus and storing instructions encoded on a computer readable medium, the instructions executable by the data processing apparatus and operable to cause the data processing apparatus to perform operations comprising:
      accessing a data storage system in data communication with the data processing apparatus;
      creating a plurality of directories in a logical storage in the data storage system, the directories including a root directory and a plurality of subdirectories in the root directory, each directory having a directory key name comprising a plurality of values that are deterministic of:
      a number of immediate subdirectories stored in the directory;
      at least a portion of the directory key name of each subdirectory;
      a number of files stored in the directory; and
      at least a portion of the file name of each file stored in the subdirectory; wherein each directory key name comprises:
   a prefix value;
   a subdirectory value, the subdirectory value defining a number of immediate subdirectories in the directory;
   a subdirectory prefix value, the subdirectory prefix value defining a prefix value of each directory key name of each immediate subdirectory in the directory; and a file value, the file value defining a number of files stored in the directory.

\* \* \* \* \*

UNITED STATES PATENT AND TRADEMARK OFFICE
CERTIFICATE OF CORRECTION

PATENT NO. : 9,697,210 B1  
APPLICATION NO. : 12/493546  
DATED : July 4, 2017  
INVENTOR(S) : Scott Lee Page 1 of 1

It is certified that error appears in the above-identified patent and that said Letters Patent is hereby corrected as shown below:

On the Title Page

Column 2 (Other Publications), Line 3 – delete "btX8Z2LQ94D" and insert -- btX8Z2LQ94IJ --, therefore.

Signed and Sealed this  
Tenth Day of April, 2018

Andrei Iancu  
*Director of the United States Patent and Trademark Office*